United States Patent
Kim et al.

(10) Patent No.: US 8,976,313 B2
(45) Date of Patent: Mar. 10, 2015

(54) OUTDOOR DISPLAY APPARATUS

(75) Inventors: Sru Kim, Anyang-si (KR); Jin Hyun Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 246 days.

(21) Appl. No.: 13/442,337

(22) Filed: Apr. 9, 2012

(65) Prior Publication Data
US 2012/0255721 A1    Oct. 11, 2012

(30) Foreign Application Priority Data

Apr. 8, 2011  (KR) .................. 10-2011-0032735

(51) Int. Cl.
| | | |
|---|---|---|
| *G02F 1/1333* | (2006.01) | |
| *G02F 1/1347* | (2006.01) | |
| *H05K 7/20* | (2006.01) | |
| *G09F 19/22* | (2006.01) | |
| *G09F 13/04* | (2006.01) | |

(52) U.S. Cl.
CPC .......... *G02F 1/133382* (2013.01); *G09F 19/22* (2013.01); *G09F 13/04* (2013.01); *G02F 1/133385* (2013.01); *G02F 2201/36* (2013.01); *G02F 2001/133342* (2013.01)
USPC ............... 349/58; 349/74; 349/161; 361/694; 361/695

(58) Field of Classification Search
USPC ................. 349/58, 74, 161; 361/694, 695
See application file for complete search history.

(56) References Cited

U.S. PATENT DOCUMENTS

| | | | |
|---|---|---|---|
| 2008/0236005 A1 | 10/2008 | Isayev et al. | |
| 2010/0182562 A1* | 7/2010 | Yoshida et al. | ............... 349/161 |
| 2011/0085301 A1* | 4/2011 | Dunn | ............................ 361/695 |

FOREIGN PATENT DOCUMENTS

| | | |
|---|---|---|
| JP | 2005-134849 A | 5/2005 |
| KR | 10-2009-0109701 A | 10/2009 |

OTHER PUBLICATIONS

Communication from the European Patent Office issued Feb. 11, 2013 in counterpart European Application No. 12161733.6.

* cited by examiner

*Primary Examiner* — Michael Caley
(74) *Attorney, Agent, or Firm* — Sughrue Mion, PLLC (57) ABSTRACT

Provided is an outdoor display apparatus having an improved configuration to effectively prevent deterioration of a panel included therein. The outdoor display apparatus includes: a casing body having an air inlet and an air outlet; first and second display panel modules in the casing body to display images on front and rear surfaces of the casing body, respectively; transparent members fitted respectively to the front surface and the rear surface of the casing body to protect the first and second display panel modules; an air suction unit to suction the air into the casing body through the inlet and to discharge the air through the outlet; and an air distribution unit to distribute the air discharged from the air suction unit to at least one of the first display panel module and the second display panel module.

19 Claims, 7 Drawing Sheets

OUTDOOR DISPLAY APPARATUS

CROSS-REFERENCE TO RELATED APPLICATION

This application claims priority from Korean Patent Application No. 10-2011-0032735, filed on Apr. 8, 2011 in the Korean Intellectual Property Office, the disclosure of which is incorporated herein by reference in its entirety.

BACKGROUND

1. Field

Apparatuses and methods consistent with exemplary embodiments relate to an outdoor display apparatus that is placed and used in an outdoor area.

2. Description of the Related Art

An outdoor display apparatus may, for example, be placed outside of a building to display an image. One example of the outdoor display apparatus is an outdoor billboard.

In general, such an outdoor display apparatus includes a casing body, a transparent member fitted to a surface of the casing body, and a display panel module located inside the transparent member to display an image. A Liquid Crystal Display (LCD) panel, a Plasma Display Panel (PDP) panel, an Organic Light Emitting Diode (OLED) panel, and the like may be used in the display panel module. Recently, outdoor display apparatuses using LCD panels have been widely used.

In the case of an LCD panel, a surface temperature of the panel may rise beyond a normal operating temperature range when directly exposed to sunlight, causing deterioration of the LCD panel, thereby disabling the LCD panel from accurately displaying an image.

SUMMARY

Therefore, an aspect of an exemplary embodiment provides an outdoor display apparatus having an improved configuration to effectively prevent deterioration of a panel included therein.

Additional aspects will be set forth in part in the description which follows and, in part, will be obvious from the description, or may be learned by practice of an exemplary embodiment.

According to an aspect of an exemplary embodiment, there is provided an outdoor display apparatus, including: a casing body having an inlet, through which outside air is introduced, and an outlet, through which the air introduced through the inlet is discharged; a first display panel module placed in the casing body to display an image on a front surface of the casing body; a second display panel module placed in the casing body to display an image on a rear surface of the casing body; transparent members fitted respectively to the front surface and rear surface of the casing body to protect the first display panel module and the second display panel module; an air suction unit to assist in suctioning the air into the casing body through the inlet and thereafter, discharging the air through the outlet; and an air distribution unit to distribute the air discharged from the air suction unit to the first display panel module or the second display panel module.

The transparent members may be spaced apart from the first display panel module and the second display panel module to define a first gap and a second gap with the first display panel module and the second display panel module, respectively.

The air distribution unit may include a first guide member and a second guide member rotatably coupled, respectively, to the top of the air suction unit.

The first guide member and the second guide member may be oriented by different rotating angles to allow different amounts of air to be distributed to the first display panel module and the second display panel module.

Each of the first display panel module and the second display panel module may include a display panel to display an image on a front surface thereof, a backlight unit coupled to a rear surface of the display panel to irradiate light to the display panel, and a controller coupled to a rear surface of the backlight unit to control driving of the display panel and the backlight unit.

Each of the first display panel module and the second display panel module may further include a temperature sensor to sense a surface temperature of the display panel.

Based on a result of comparison of the surface temperatures of both the display panels measured via the temperature sensors, if the temperature of the display panel included in the first display panel module is greater, the first guide member may be oriented by the rotating angle greater than the rotating angle of the second guide member, to allow much more of the air discharged from the air suction unit to move to the first gap, and if the temperature of the display panel included in the second display panel module is greater, the second guide member may be oriented by the rotating angle greater than the rotating angle of the first guide member, to allow much more of the air discharged from the air suction unit to move to the second gap.

Each of the first display panel module and the second display panel module may include a photo-sensor to sense the quantity of sunlight irradiated to the surface of the display panel.

Based on a result of comparison of the quantities of sunlight irradiated to both the display panels measured via the photo-sensors, if a greater quantity of sunlight is irradiated to the display panel included in the first display panel module, the first guide member may be oriented by the rotating angle greater than the rotating angle of the second guide member, to allow much more of the air discharged from the air suction unit to move to the first gap, and if a greater quantity of sunlight is irradiated to the display panel included in the second display panel module, the second guide member may be oriented by the rotating angle greater than the rotating angle of the first guide member, to allow much more of the air discharged from the air suction unit to move to the second gap.

The inlet may be provided at the front surface or the rear surface of the casing body.

The inlet may be provided at a lower surface of the casing body.

The outlet may be provided at a lateral surface of the casing body.

The air suction unit may be placed below the first display panel module and the second display panel module.

The air distribution unit may include a guide rail placed in a lower region of the casing body perpendicular to the front surface or the rear surface of the casing body, and a guide block to be rectilinearly reciprocally movable on the guide rail, and the guide block may be coupled to the bottom of the air suction unit to rectilinearly reciprocate the air suction unit toward the front surface or the rear surface of the casing body.

A position of the air suction unit may be adjusted such that different amounts of air are distributed to the first display panel module and the second display panel module.

The transparent members may be spaced apart from the first display panel module and the second display panel module to define a first gap and a second gap with the first display panel module and the second display panel module respectively.

Each of the first display panel module and the second display panel module may include a display panel to display an image on a front surface thereof, a backlight unit coupled to a rear surface of the display panel to irradiate light to the display panel, and a controller coupled to a rear surface of the backlight unit to control driving of the display panel and the backlight unit.

Each of the first display panel module and the second display panel module may further include a temperature sensor to sense a surface temperature of the display panel.

Based on a result of comparison of the surface temperatures of both the display panels measured via the temperature sensors, if the temperature of the display panel included in the first display panel module is greater, the air suction unit may be moved closer to the front surface than the rear surface of the casing body, to allow much more of the air discharged from the air suction unit to move to the first gap, and if the temperature of the display panel included in the second display panel module is greater, the air suction unit may be moved closer to the rear surface than the first surface of the casing body, to allow much more of the air discharged from the air suction unit to move to the second gap.

Each of the first display panel module and the second display panel module may include a photo-sensor to sense the quantity of sunlight irradiated to the surface of the display panel.

Based on a result of comparison of the quantities of sunlight irradiated to both the display panels measured via the photo-sensors, if a greater quantity of sunlight is irradiated to the display panel included in the first display panel module, the air suction unit may be moved closer to the front surface than the rear surface of the casing body, to allow much more of the air discharged from the air suction unit to move to the first gap, and if a greater quantity of sunlight is irradiated to the display panel included in the second display panel module, the air suction unit may be moved closer to the rear surface than the front surface of the casing body, to allow much more of the air discharged from the air suction unit to move to the second gap.

According to an aspect of another exemplary embodiment, there is provided a display apparatus, including: a casing body having an inlet, through which air is introduced, and an outlet, through which the air introduced through the inlet is discharged; a display panel module in the casing body which displays an image on a front surface of the casing body; an air suction unit which suctions the air into the casing body through the inlet and discharges the suctioned air through the outlet; and an air distribution unit which selectively distributes the suctioned air from the air suction unit to a first air distribution path from the air suction unit to the outlet and a second air distribution path from the air suction unit to the outlet.

According to an aspect of another exemplary embodiment, there is provided a method of distributing intake air in an outdoor display apparatus; the method including: obtaining at least one of a difference between a first temperature of a first area corresponding to a front surface of the outdoor display apparatus and a second temperature of second area corresponding to a rear surface of the outdoor display apparatus, and a difference between a first quantity of light irradiated to the front surface and a second quantity of light irradiated to the rear surface; and based on the obtained at least one difference, selectively distributing air suctioned into the outdoor display apparatus to a first air distribution path closer to the front surface than the rear surface, and a second air distribution path closer to the rear surface than the front surface.

BRIEF DESCRIPTION OF THE DRAWINGS

These and/or other aspects will become apparent and more readily appreciated from the following description of exemplary embodiments, taken in conjunction with the accompanying drawings of which.

DETAILED DESCRIPTION OF EXEMPLARY EMBODIMENTS

Reference will now be made in detail to exemplary embodiments, examples of which are illustrated in the accompanying drawings, wherein like reference numerals refer to like elements throughout.

Figure 1:
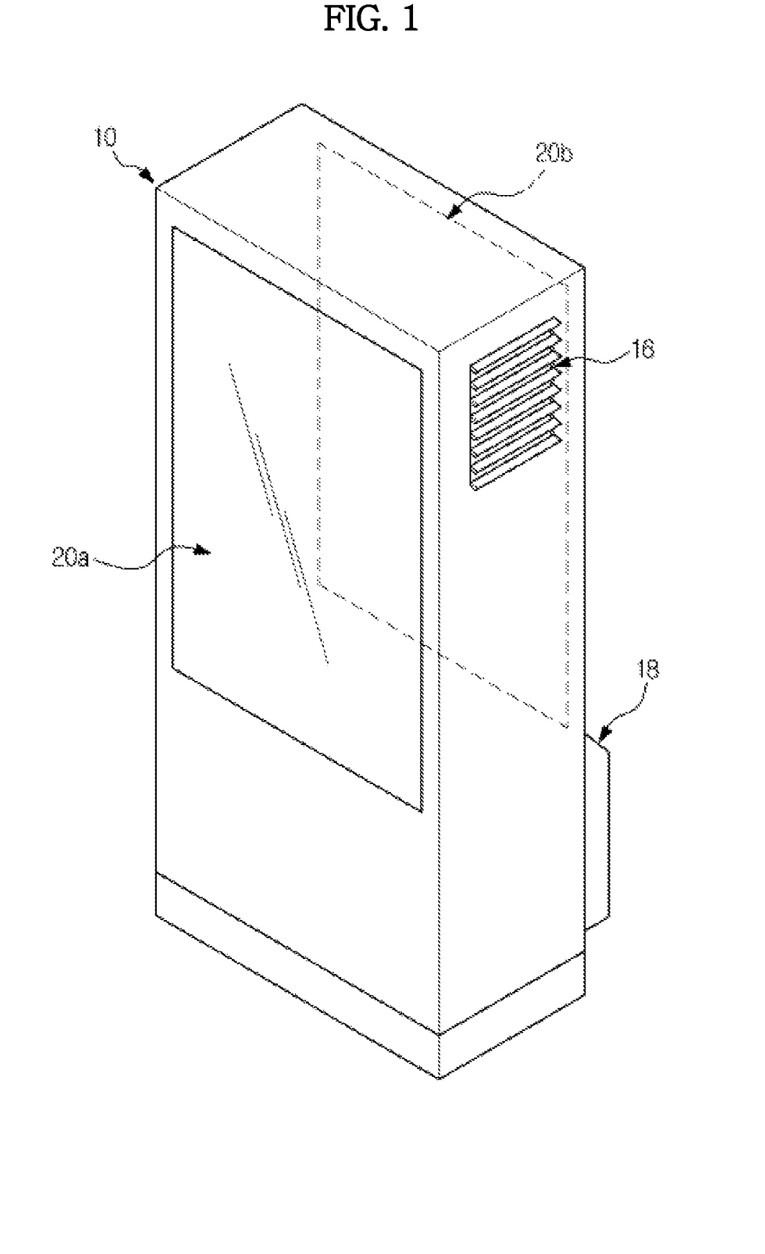
FIG. 1 is a perspective view illustrating an outdoor display apparatus according to an exemplary embodiment.
Figure 2:
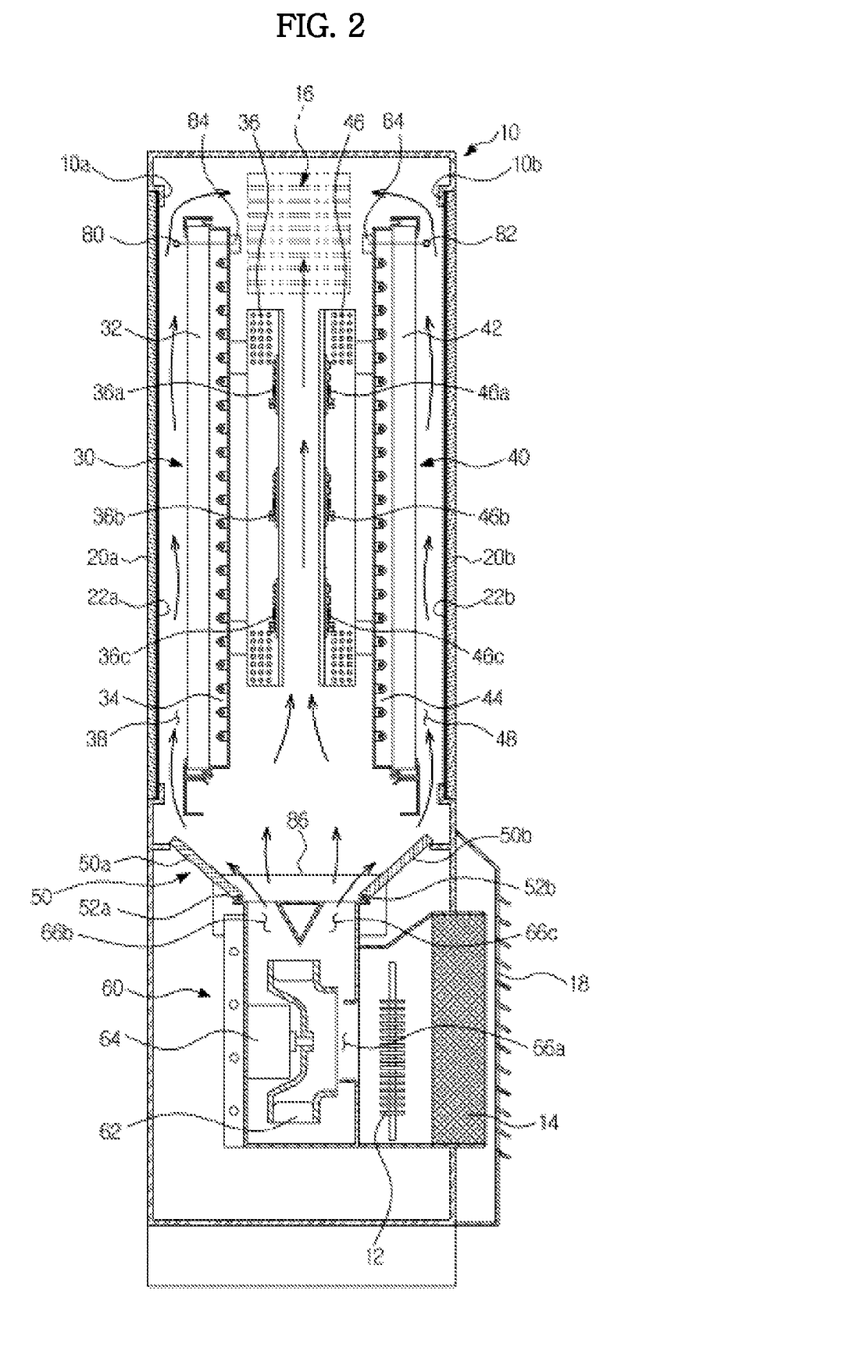
FIG. 2 is a sectional view of an outdoor display apparatus according to an exemplary embodiment.

FIG. 1 is a perspective view illustrating an outdoor display apparatus according to an exemplary embodiment, and FIG. 2 is a sectional view of an outdoor display apparatus according to an exemplary embodiment.

As illustrated in FIGS. 1 and 2, the outdoor display apparatus includes a casing body 10 that defines the external appearance of the apparatus and supports components therein, transparent members 20a and 20b fitted to front and rear surfaces of the casing body 10, and display panel modules 30 and 40 accommodated in the casing body 10. The display panel modules 30 and 40 display images on the front and rear surfaces of the casing body 10.

The casing body 10 has a rectangular or an approximately rectangular shape and openings 10a and 10b are perforated in upper portions of the front and rear surfaces of the casing body 10.

The transparent members 20a and 20b are fitted respectively into openings 10a and 10b perforated in the front and rear surfaces of the casing body 10. The transparent members 20a and 20b are formed of a transparent material having sufficient rigidity, such as reinforced glass, etc. The transparent members 20a and 20b protect the display panel modules 30 and 40 from an outdoor environment and allow images displayed on the display panel modules 30 and 40 to be visible from the outside.

Optical films 22a and 22b may be attached to rear surfaces of the transparent members 20a and 20b, to prevent sunlight reflected from display panels 32 and 42 from being directed to the outside because the outwardly directed light may cause unclear images to be displayed. Although not illustrated, an antistatic film, which restricts generation of static electricity to prevent exterior dust or dirt from being adhered to the transparent members 20a and 20b or front surfaces of the display panels 32 and 42, or an anti-reflective film which reduces reflection of light, may be attached to the rear surfaces of the transparent members 20a and 20b, to achieve enhanced display performance.

The display panel modules 30 and 40 include a first display panel module 30 to display an image on the front surface of the casing body 10 and a second display panel module 40 to display an image on the rear surface of the casing body 10. The first display panel module 30 is located to correspond to the transparent member 20a at a position inwardly spaced from the transparent member 20a by a predetermined distance. The second display panel module 40 is located to correspond to the transparent member 20b at a position inwardly spaced from the transparent member 20b by a predetermined distance. In one or more exemplary embodiments, the outdoor display apparatus may be configured to display images in opposite directions on the front and rear surfaces thereof. However, it is understood that one or more other exemplary embodiments are not limited thereto, and may include only one display panel module 40 or may display an image in one direction on a front or a rear surface thereof.

The first display panel module 30 includes a display panel 32 to display an image on the front surface thereof, a backlight unit 34 coupled to a rear surface of the display panel 32 to irradiate light to the display panel 32, and a controller 36 coupled to a rear surface of the backlight unit 34 to control driving of the display panel 32 and the backlight unit 34.

The display panel 32 is spaced apart from the transparent member 20a inward of the casing body 10 by a predetermined distance to define a first gap 38 with the transparent member 20a.

The backlight unit 34 to irradiate light to the display panel 32 may be a vertical type backlight unit in which a light source is located at the rear of the display panel 32 to directly irradiate light to the display panel, or an edge type backlight unit in which a light source is located at one or more side edges of a display panel 32 and a light guide plate is used to disperse light for indirect irradiation of light to the display panel 32 (e.g., a liquid crystal display panel). In the present exemplary embodiment, the outdoor display apparatus employs a vertical type backlight unit. Moreover, it is understood that in one or more other exemplary embodiments, the display panel 32 is self-illuminating and the outdoor display apparatus does not include a backlight unit 34.

The controller 36 includes a drive element 36a to drive the display panel 32 and the backlight unit 34, a signal processor 36b to assist in displaying an image on the display panel 32 by receiving an image signal from the outside or from an internal storage unit, and a power supplier 36c connected to an external power source to convert power transmitted from the external power source and distribute the power to the drive element 36a and the signal processor 36b.

The second display panel module 40 is located to correspond to the first display panel module 30 on the basis of the center of the casing body 10. The second display panel module 40 includes a display panel 42 to display an image on the front surface thereof, a backlight unit 44 coupled to a rear surface of the display panel 42 to irradiate light to the display panel 42, and a controller 46 coupled to a rear surface of the backlight unit 44 to control driving of the display panel 42 and the backlight unit 44. The display panel 42 is spaced apart form the transparent member 20b inward of the casing body 10 by a predetermined distance to define a second gap 48 with the transparent member 20b.

The display panel 42, backlight unit 44 and controller 46 have the same or similar configurations and operations as the display panel 32, backlight unit 34 and controller 36 included in the panel module 30 and thus, a description thereof will be omitted herein.

The first display panel module 30 and the second display panel module 40 further include a first sensor 80 and a second sensor 82, respectively. The first sensor 80 and the second sensor 82 may include at least one of temperature sensors that sense surface temperatures of the display panels 32 and 42, and photo-sensors that sense the quantity of sunlight irradiated to the surfaces of the display panels 32 and 42.

The first sensor 80 and the second sensor 82 are connected to drive controllers 84, respectively. The driving controllers 84 control driving of an air distribution unit 50 or 70 based on at least one of sunlight irradiated to the surfaces of the display panels 32 and 42, and results of comparison of the surface temperatures of the display panels 32 and 42 sensed by the first and second sensors 80 and 82.

Although the backlight units 34 and 44 have been described as including the display panels 32 and 42 in the form of LCD panels, the backlight units 34 and 44 may be omitted if the display panels 32 and 42 are self-emitting display panels, such as PDPs, OLEDs, etc.

The outdoor display apparatus according to an exemplary embodiment includes an air suction unit 60 to circulate the interior air of the casing body 10 for normal operation even under an outdoor environment having temperature and humidity changes greater than an indoor environment, and the air distribution unit 50 or 70 to distribute the air within the casing body 10 in a particular direction.

An inlet 18 is provided at a surface (e.g., the front surface or the rear surface of the casing body 10) to allow outside air to be introduced into the casing body 10. An outlet 16 is provided at a lateral surface of the casing body 10 to allow the air introduced through the inlet 18 to be discharged from the casing body 10. Although not illustrated, the inlet 18 may be provided at a lower surface of the casing body 10.

A filter 14 is accommodated in the casing body 10 near the inlet 18, to filter impurities contained in the air introduced through the inlet 18. A heater 12 is located between the air suction unit 60 and the filter 14. The heater 12 heats the air introduced through the inlet 18 so as to prevent the display panels 32 and 42 from being frozen at a low temperature, e.g., in winter.

On/Off of the heater 12 may be controlled by the sensors 80 and 82 that will be described hereinafter. For example, if the interior temperature of the casing body 10 measured by the sensors 80 and 82 exceeds a predetermined value in high-temperature conditions (e.g., during daytime or summer), the heater 12 is switched off. If the interior temperature of the casing body 10 measured by the sensors 80 and 82 falls below a predetermined value in low-temperature conditions (e.g., during night or winter), the heater 12 is switched on to heat the air introduced through the inlet 18.

The air suction unit 60 is accommodated in the casing body 10 and includes a fan 62 to generate suction force and blowing force via rotation thereof, a drive motor 64 to provide drive force to rotate the blowing fan 62, and path guides 66a, 66b and 66c to guide the air suctioned into or discharged from the fan 62. The air suction unit 60 assists in introducing the outside air into the casing body 10 through the inlet 18 and discharging the air from the casing body 10 through the outlet 16.

The fan 62 is a centrifugal fan that suctions air in an axial direction and discharges the air in a radial direction.

The path guides 66a, 66b and 66c include a first path guide 66a to guide the air introduced through the inlet 18 toward the fan 62, and a second path guide 66b and third path guide 66c which are arranged at radially outward positions of the fan 62 to guide air discharged from the fan 62 toward at least one of the first display panel module 30 and the second display panel module 40.

The air suctioned by the fan 62 is introduced into the casing body 10 through the inlet 18. The introduced air sequentially passes through the filter 14, heater 12, air suction unit 60, and air distribution unit 50, thereby being distributed to at least one of the first display module 30 and the second display module 40. After heating or cooling front and rear regions of at least one of the first display panel module 30 and the second display panel module 40, the air is discharge from the casing body 10 to the outside through the outlet 16.

The air distribution unit 50 is located above the air suction unit 60 so as to distribute the air discharged through the second path guide 66b and third path guide 66c toward at least one of the first display panel module 30 and the second display panel module 40.

The air distribution unit 50 includes a first guide member 50a and a second guide member 50b, which are rotatably mounted about hinge shafts 52a and 52b arranged at the top of the air suction unit 60. The first guide member 50a and the second guide member 50b are connected to a guide drive motor 86 that is controlled by the drive controller 84. The guide drive motor 86 may be a stepper motor (not shown) that rotates the first guide member 50a and the second guide member 50b by a predetermined angle.

Orienting the first guide member 50a and the second guide member 50b by different rotating angles allows the air discharged through the second path guide 66b and third path guide 66c to be differently distributed to at least one of the first display panel module 30 and the second display panel module 40.

Figure 3:
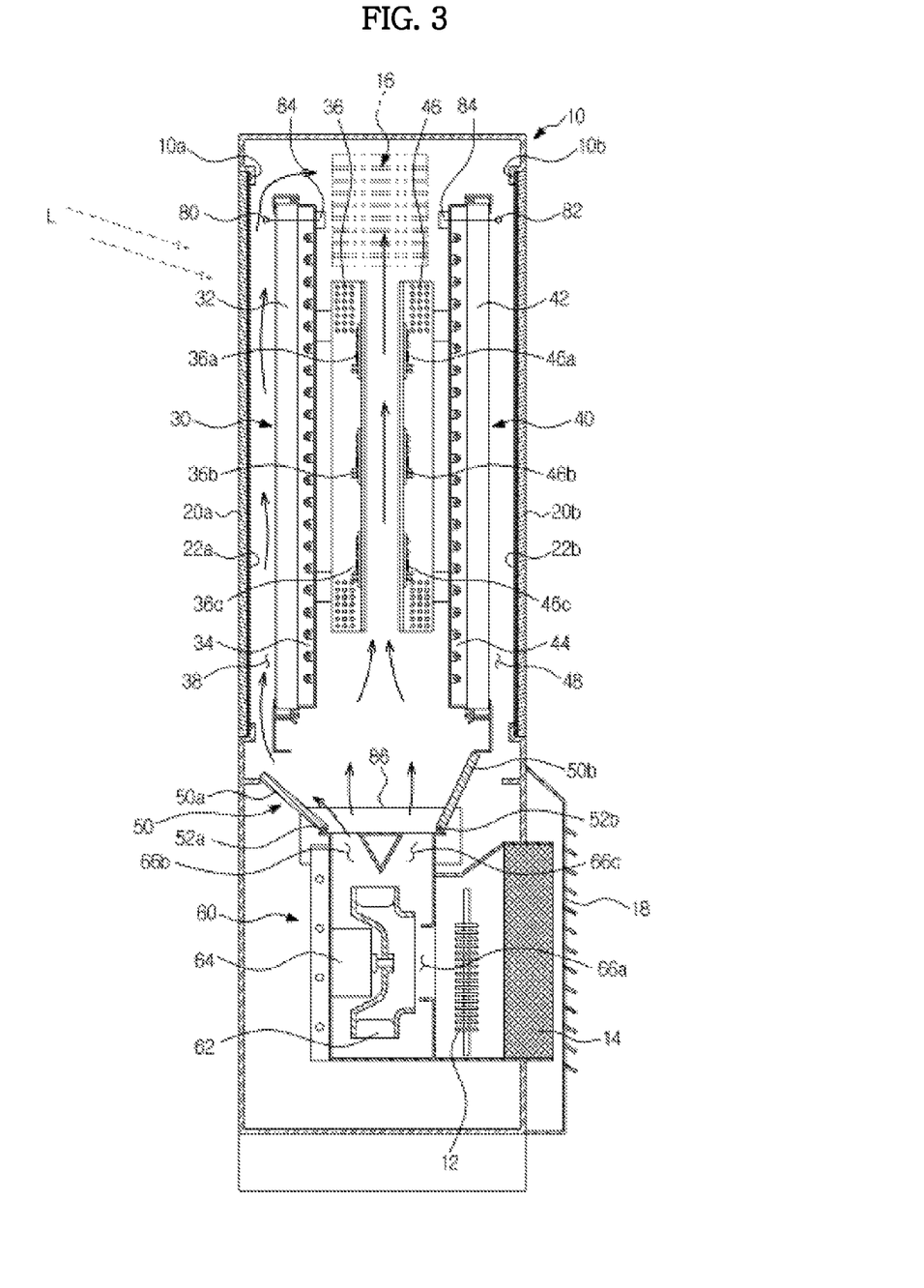
FIGS. 3 and 4 are views illustrating different positions of a guide member in FIG. 2 depending on a sunlight irradiation direction.
Figure 4:
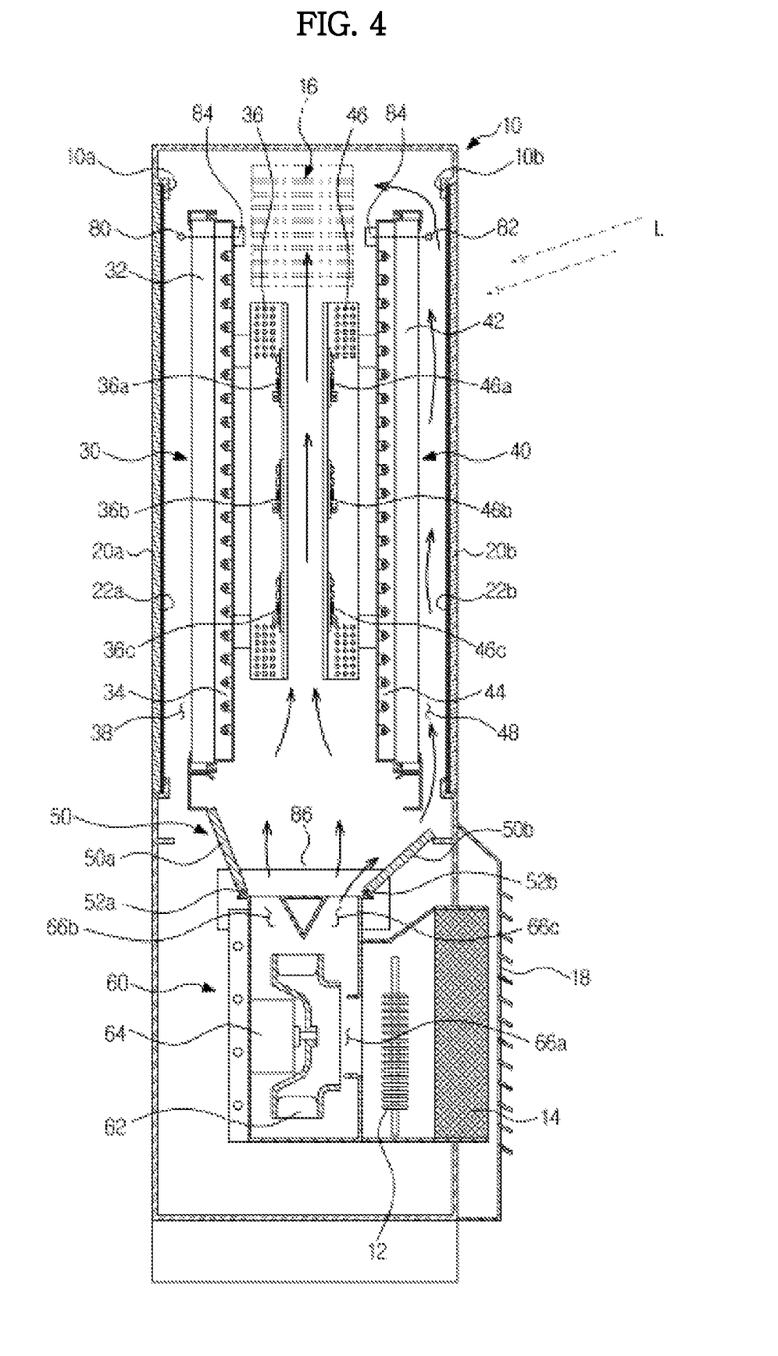

FIGS. 3 and 4 are views illustrating different positions of the first and second guide members 50a and 50b in FIG. 2 depending on a sunlight irradiation direction.

As illustrated in FIG. 3, if sunlight L is irradiated toward the front surface of the outdoor display apparatus, the at least one first sensor 80 senses at least one of the quantity of sunlight L directed to the surface of the display panel 32 and the surface temperature of the display panel 32 included in the first display panel module 30 adjacent to the front surface of the outdoor display apparatus.

If the quantity of sunlight L directed to the surface of the display panel 32 or the surface temperature of the display panel 32, sensed by the at least one first sensor 80, is greater than the quantity of sunlight L directed to the surface of the display panel 42 or the surface temperature of the display panel 42 that is sensed by the at least one second sensor 82, the drive controller 84 controls the guide drive motor 86 to cause the first guide member 50a to be rotated by a greater angle than that of the second guide member 50b, which allows more of the air discharged through the second path guide 66b and the third path guide 66c to be distributed to the first display panel module 30 than the second display panel module 40. More specifically, most of the air discharged through the second path guide 66b moves through the first gap 38 between the display panel 32 and the transparent member 20a, acting to cool the front surface of the display panel 32, and most of the air discharged through the third path guide 66c moves to the controller 36 of the first display panel module 30 and the controller 46 of the second display panel module 40, acting to prevent overheating of the controllers 36 and 46. The air, which has been introduced into the first gap 38 and the controllers 36 and 46 to thereby absorb heat from the front surface of the display panel 32 and the controllers 36 and 46, is discharged from the casing body 10 through the outlet 16.

As illustrated in FIG. 4, if sunlight L is directed toward the rear surface of the outdoor display apparatus, at least one second sensor 82 senses at least one of the quantity of sunlight L directed to the surface of the display panel 42 and the surface temperature of the display panel 42 included in the second display panel module 40 adjacent to the rear surface of the outdoor display apparatus. If the quantity of sunlight L directed to the surface of the display panel 42 or the surface temperature of the display panel 42, sensed by the at least one second sensor 82, is greater than the quantity of sunlight L directed to the surface of the display panel 32 or the surface temperature of the display panel 32 that is sensed by the at least one first sensor 80, the drive controller 84 controls the guide drive motor 86 to cause the second guide member 50b to be rotated by a greater angle than that of the first guide member 50a, which allows more of the air discharged through the second path guide 66b and the third path guide 66c to be distributed to the second display panel module 40 than the first display panel module 30. More specifically, most of the air discharged through the third path guide 66c moves through the second gap 48 between the display panel 42 and the transparent member 20b, acting to cool the front surface of the display panel 42, and most of the air discharged through the second path guide 66b moves to the controller 46 of the second display panel module 40 and the controller 36 of the first display panel module 30, acting to prevent overheating of the controllers 36 and 46. The air, which has been introduced into the second gap 48 and the controllers 36 and 46 to thereby absorb heat from the front surface of the display panel 42 and the controllers 36 and 46, is discharged from the casing body 10 through the outlet 16.

As illustrated in FIG. 2, during a condition (e.g., night) when sunlight L is not directed to the front surface and the rear surface of the casing body 10, the first guide member 50a and the second guide member 50b have the same rotating angle to ensure that the same amount of air moves into the first gap 38 and the second gap 48.

Through use of the above-described air distribution unit 50 and the air suction unit 60 having the single fan 62, it may be possible to prevent deterioration of the first display panel module 30 and the second display panel module 40 arranged at the front and the rear surfaces of the casing body 10, which results in reduced manufacturing costs of products and enhanced productivity as well as a slimmer design and smaller installation space.

Hereinafter, another exemplary embodiment of the outdoor display apparatus will be described.

Figure 5:
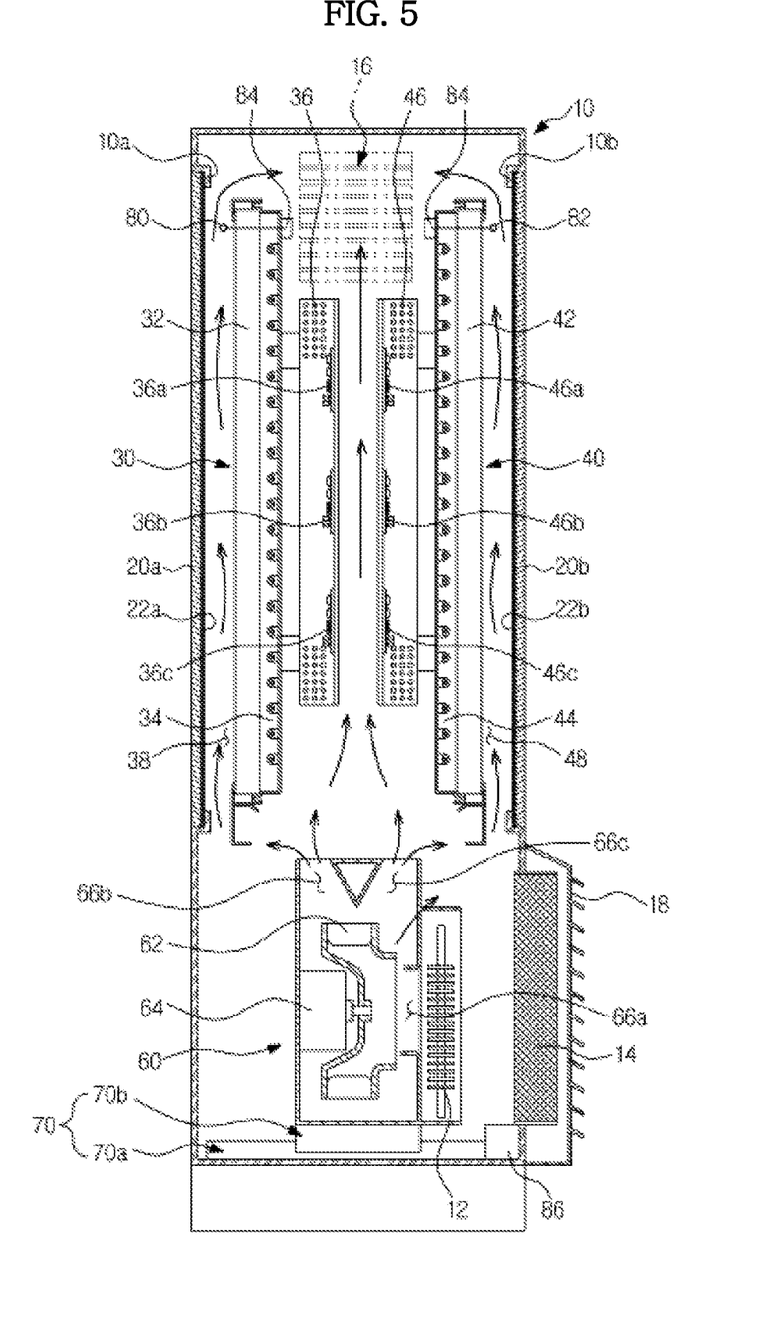
FIG. 5 is a sectional view illustrating an outdoor display apparatus according to another exemplary embodiment.

FIG. 5 is a sectional view illustrating an outdoor display apparatus according to another exemplary embodiment.

In the case of the outdoor display apparatus according to the present exemplary embodiment, other configurations except for the air distribution unit 70 are identical to or similar to those in the above-described exemplary embodiment and thus, only the air distribution unit 70 will be described hereinafter.

As illustrated in FIG. 5, the air distribution unit 70 is coupled to the bottom of the air suction unit 60 and rectilinearly reciprocates the air suction unit 60 between the front surface and the rear surface of the casing body 10 within the casing body 10.

The air distribution unit 70 includes a guide rail 70a on a bottom surface of the casing body 10 perpendicular to the front surface or the rear surface of the casing body 10, and a guide block 70b reciprocally rectilinearly coupled to the guide rail 70a. The guide block 70b is coupled to the bottom of the air suction unit 60 so as to rectilinearly reciprocate the air suction unit 60 between the front surface and the rear surface of the casing body 10 within the casing body 10. The guide block 70b is connected to the guide drive motor 86 that is controlled by the drive controller 84. The guide drive motor 86 may be a stepper motor (not shown) that rectilinearly moves the guide block 70b by a predetermined distance.

As the air suction unit 60 is moved closer to the front surface or the rear surface of the casing body 10 by the air distribution unit 70, the air discharged through the second path guide 66b and the third path guide 66c is differentially distributed to the first display panel module 30 and the second display panel module 40.

Although the air distribution unit 70 has been described above as including the guide rail 70a and the guide block 70b by way of example, the air distribution unit 70 is not limited to the guide rail 70a and the guide block 70b. For example, according to one or more other exemplary embodiments, other kinds of drive devices, such as a transfer structure using a ball screw and ball nut and a transfer structure using a rack and pinion, are applicable and are coupled to the air suction unit 60 to enable rectilinear reciprocation of the air suction unit 60.

Figure 6:
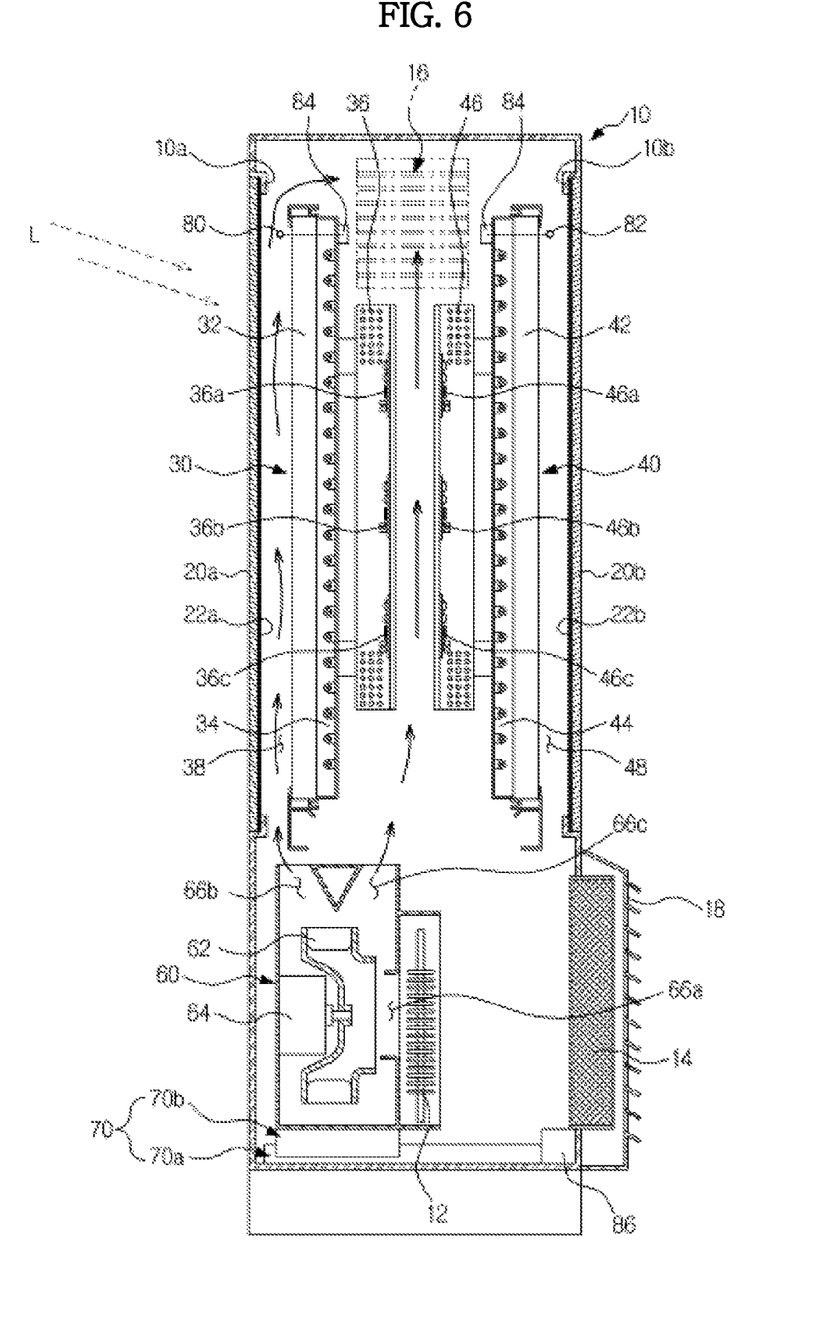
FIGS. 6 and 7 are views illustrating different positions of an air suction unit in FIG. 5 depending on a sunlight irradiation direction.
Figure 7:
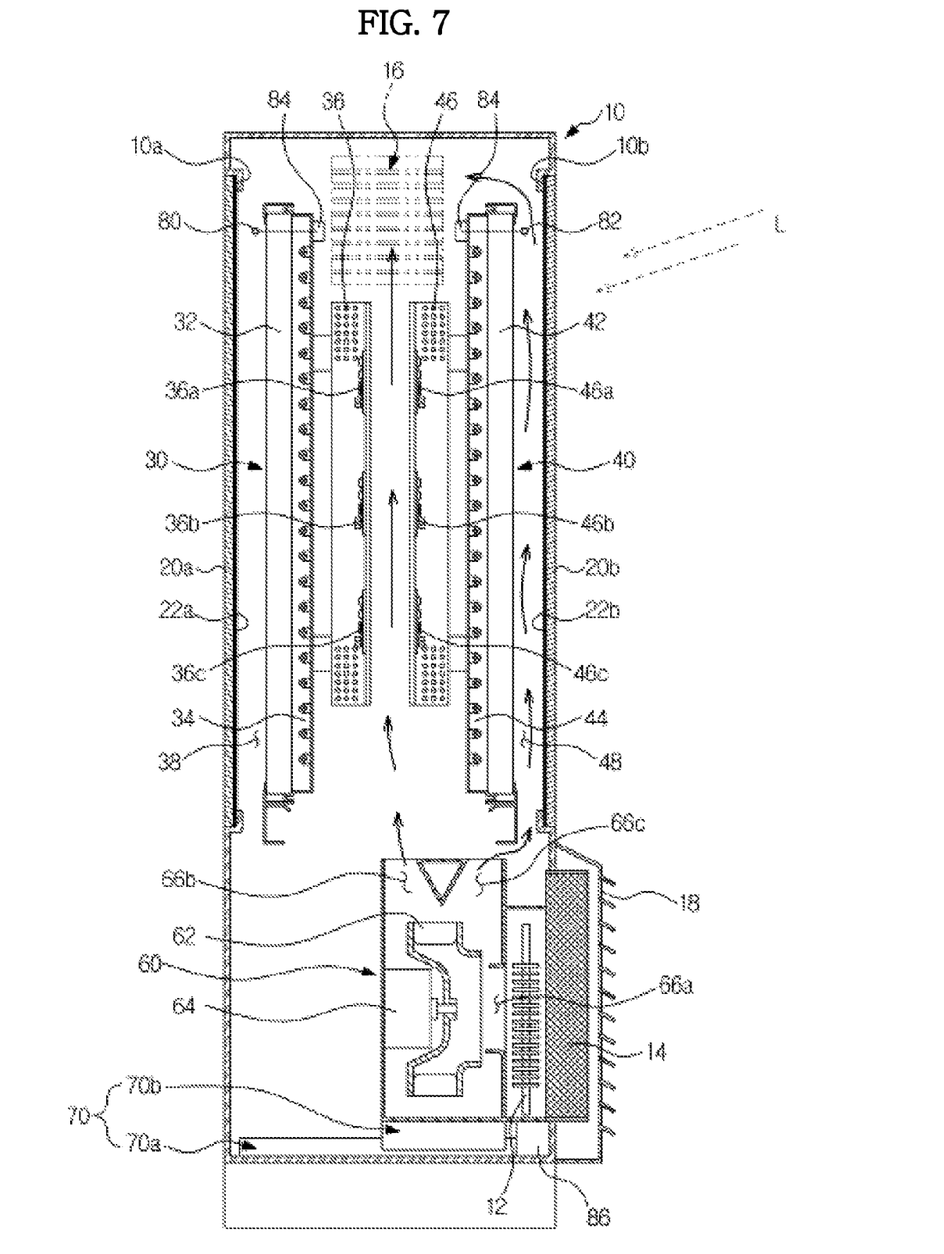

FIGS. 6 and 7 are views illustrating different positions of the air suction unit 60 in FIG. 5 depending on a sunlight irradiation direction.

As illustrated in FIG. 6, if sunlight L is irradiated to the front surface of the outdoor display apparatus, one or more first sensors 80 sense at least one of the quantity of sunlight L directed to the surface of the display panel 32 and the surface temperature of the display panel 32 included in the first display panel module 30 adjacent to the front surface of the outdoor display apparatus.

If the quantity of sunlight L directed to the surface of the display panel 32 or the surface temperature of the display panel 32, sensed by the at least one first sensor 80, is greater than the quantity of sunlight L directed to the surface of the display panel 42 or the surface temperature of the display panel 42 that is sensed by the at least one second sensor 82, the drive controller 84 enables movement of the air suction unit 60 such that the air suction unit 60 is located closer to the front surface than the rear surface of the casing body 10 or closer to the first display panel module 30 than the second display panel module 40, which allows more of the air discharged through the second path guide 66b and the third path guide 66c to be distributed to the first display panel module 30 than the second display panel module 40. More specifically, most of the air discharged through the second path guide 66b moves through the first gap 38 between the display panel 32 and the transparent member 20a, acting to cool the front surface of the display panel 32, and most of the air discharged through the third path guide 66c moves to the controller 36 of the first display panel module 30 and the controller 46 of the second display panel module 40, acting to prevent overheating of the controllers 36 and 46. The air, which has been introduced into the first gap 38 and the controllers 36 and 46 to thereby absorb heat from the front surface of the display panel 32 and the controllers 36 and 46, is discharged from the casing body 10 through the outlet 16.

As illustrated in FIG. 7, if sunlight L is directed toward the rear surface of the outdoor display apparatus, the at least one second sensor 82 senses at least one of the quantity of sunlight L directed to the surface of the display panel 42 and the surface temperature of the display panel 42 included in the second display panel module 40 adjacent to the rear surface of the outdoor display apparatus. If the quantity of sunlight L directed to the surface of the display panel 42 or the surface temperature of the display panel 42, sensed by the at least one second sensor 82, is greater than the quantity of sunlight L directed to the surface of the display panel 32 or the surface temperature of the display panel 32 that is sensed by the at least one first sensor 80, the drive controller 84 enables movement of the air suction unit 60 such that the air suction unit 60 is located closer to the rear surface than the front surface of the casing body 10 or closer to the second display panel module 30 than the first display panel module 40, which allows more of the air discharged through the second path guide 66b and the third path guide 66c to be distributed to the second display panel module 40 than the first display panel module 30. More specifically, most of the air discharged through the third path guide 66c moves through the second gap 48 between the display panel 42 and the transparent member 20b, acting to cool the front surface of the display panel 42, and most of the air discharged through the second path guide 66b moves to the controller 46 of the second display panel module 40 and the controller 36 of the first display panel module 30, acting to prevent overheating of the controllers 36 and 46. The air, which has been introduced into the second gap 48 and the controllers 36 and 46 to thereby absorb heat from the front surface of the display panel 42 and the controllers 36 and 46, is discharged from the casing body 10 through the outlet 16.

As illustrated in FIG. 5, during a condition (e.g., night) when sunlight L is not directed to the front surface and the rear surface of the casing body 10, the air suction unit 60 is positioned to ensure that the same amount of air moves into the first gap 38 and the second gap 48.

As is apparent from the above description, according to exemplary embodiments, controlling heat load caused by sunlight applied to a display panel may effectively prevent operation failure of the display panel due to deterioration.

In addition, the resulting outdoor display apparatus has a slim thickness, which may reduce an installation space.

While not restricted thereto, a control system of the display apparatus or components thereof according to an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, one or more units of the outdoor display apparatus can include a processor or microprocessor executing a computer program stored in a computer-readable medium.

Although a few exemplary embodiments have been shown and described, it would be appreciated by those skilled in the art that changes may be made in these exemplary embodiments without departing from the principles and spirit of the present inventive concept, the scope of which is defined in the claims and their equivalents.

What is claimed is:
1. An outdoor display apparatus, comprising:
a casing body having an inlet, through which air is introduced, and an outlet, through which the air introduced through the inlet is discharged;
a first display panel module in the casing body which displays an image on a front surface of the casing body;

a second display panel module in the casing body which displays an image on a rear surface of the casing body;
a first transparent member on a front surface of the casing body to protect the first display panel module, and a second transparent member on a rear surface of the casing body to protect the second display panel module;
an air suction unit which suctions the air into the casing body through the inlet and discharges the suctioned air through the outlet; and
an air distribution unit which distributes the suctioned air from the air suction unit to at least one of the first display panel module and the second display panel module,
wherein the first transparent member is spaced apart from the first display panel module to define a first gap with the first display panel module and the second transparent member is spaced apart from the second display panel module to define a second gap with the second display panel module, and
wherein the air distribution unit comprises a first guide member and a second guide member rotatably coupled, respectively, to the air suction unit.

2. The apparatus according to claim 1, wherein the first guide member and the second guide member are selectively adjustable by different rotating angles to allow different amounts of the air to be distributed to the first display panel module and the second display panel module.

3. The apparatus according to claim 1, wherein each of the first display panel module and the second display panel module comprises:
a display panel which displays an image on a front surface thereof;
a backlight unit coupled to a rear surface of the display panel to irradiate light to the display panel; and
a controller coupled to a rear surface of the backlight unit to control driving of the display panel and the backlight unit.

4. The apparatus according to claim 3, wherein each of the first display panel module and the second display panel module further comprises a temperature sensor which senses a surface temperature of the respective display panel.

5. The apparatus according to claim 4, wherein, based on a result of a comparison of the sensed surface temperatures of the display panels measured via the temperature sensors:
if the temperature of the display panel included in the first display panel module is greater than the temperature of the display panel included in the second display panel module, the first guide member is oriented such that a rotating angle thereof is greater than a rotating angle of the second guide member, to allow more of the air from the air suction unit to move to the first gap than the second gap; and
if the temperature of the display panel included in the second display panel module is greater than the temperature of the display panel included in the first display panel module, the second guide member is oriented such that the rotating angle thereof is greater than the rotating angle of the first guide member, to allow more of the air from the air suction unit to move to the second gap than the first gap.

6. The apparatus according to claim 3, wherein each of the first display panel module and the second display panel module further comprises a photo-sensor which senses a quantity of sunlight irradiated to a surface of the respective display panel.

7. The apparatus according to claim 6, wherein, based on a result of a comparison of the sensed quantities of sunlight irradiated to the display panels measured via the photo-sensors:
if a greater quantity of sunlight is irradiated to the display panel included in the first display panel module than the display panel included in the second display module, the first guide member is oriented such that a rotating angle thereof is greater than a rotating angle of the second guide member, to allow more of the air from the air suction unit to move to the first gap than the second gap; and
if a greater quantity of sunlight is irradiated to the display panel included in the second display panel module than the display panel included in the first display module, the second guide member is oriented such that the rotating angle thereof is greater than the rotating angle of the first guide member, to allow more of the air from the air suction unit to move to the second gap than the first gap.

8. The apparatus according to claim 1, wherein the inlet is provided at the front surface or the rear surface of the casing body.

9. The apparatus according to claim 1, wherein the inlet is provided at a lower surface of the casing body.

10. The apparatus according to claim 1, wherein the outlet is provided at a lateral surface of the casing body.

11. The apparatus according to claim 1, wherein the first transparent member is fitted into the front surface of the casing body, and the second transparent member is fitted into the rear surface of the casing body.

12. An outdoor display apparatus, comprising:
a casing body having an inlet, through which air is introduced, and an outlet, through which the air introduced through the inlet is discharged;
a first display panel module in the casing body which plays an image on a front surface of the casing body;
a second display panel module in the casing body which displays an image on a rear surface of the casing body;
a first transparent member on a front surface of the casing body to protect the first display panel module, and a second transparent member on a rear surface of the casing body to protect the second display panel module;
an air suction unit which suctions the air into the casing body through the inlet and discharges the suctioned air through the outlet; and
an air distribution unit which distributes the suctioned air from the air suction unit to at least one of the first display panel module and the second display panel module,
wherein the air suction unit is placed below the first display panel module and the second display panel module,
wherein the air distribution unit comprises:
a guide rail in a lower region of the casing body perpendicular to at least one of the front surface and the rear surface of the casing body; and
a guide block rectilinearly reciprocally movable on the guide rail, and
wherein the guide block is coupled to the bottom of the air suction unit to rectilinearly reciprocate the air suction unit in a direction perpendicular the at least one of the front surface and the rear surface of the casing body.

13. The apparatus according to claim 12, wherein a position of the air suction unit is selectively adjustable by the air suction unit such that different amounts of air are distributed to the first display panel module and the second display panel module.

14. The apparatus according to claim 12, wherein the first transparent members is spaced apart from the first display panel module to define a first gap with the first display panel module and the second transparent member is spaced apart from the second display panel module to define a second gap with the second display panel module.

15. The apparatus according to claim 14, wherein each of the first display panel module and the second display panel module comprises:
- a display panel which displays an image on a front surface thereof;
- a backlight unit coupled to a rear surface of the display panel to irradiate light to the display panel; and
- a controller coupled to a rear surface of the backlight unit to control driving of the display panel and the backlight unit.

16. The apparatus according to claim 15, wherein each of the first display panel module and the second display panel module further comprises a temperature sensor which senses a surface temperature of the respective display panel.

17. The apparatus according to claim 16, wherein, based on a result of a comparison of the sensed surface temperatures of the display panels measured via the temperature sensors:
- if the temperature of the display panel included in the first display panel module is greater than the temperature of the display panel included in the second display module, the air suction unit is moved closer to the front surface of the casing body than the rear surface of the casing body, to allow more of the air from the air suction unit to move to the first gap than the second gap; and
- if the temperature of the display panel included in the second display panel module is greater than the temperature of the display panel included in the first display module, the air suction unit is moved closer to the rear surface of the casing body than the first surface of the casing body, to allow more of the air from the air suction unit to move to the second gap than the first gap.

18. The apparatus according to claim 15, wherein each of the first display panel module and the second display panel module further comprises a photo-sensor to sense a quantity of sunlight irradiated to a surface of the respective display panel.

19. The apparatus according to claim 18, wherein, based on a result of a comparison of the quantities of sunlight irradiated to the display panels measured via the photo-sensors:
- if a greater quantity of sunlight is irradiated to the display panel included in the first display panel module than the display panel included in the second display module, the air suction unit is moved closer to the front surface of the casing body than the rear surface of the casing body, to allow more of the air from the air suction unit to move to the first gap than the second gap; and
- if a greater quantity of sunlight is irradiated to the display panel included in the second display panel module than the display panel included in the first display module, the air suction unit is moved closer to the rear surface of the casing body than the front surface of the casing body, to allow much of the air from the air suction unit to move to the second gap than the first gap.

* * * * *